(12) United States Patent
Takamori

(10) Patent No.: US 10,513,639 B2
(45) Date of Patent: Dec. 24, 2019

(54) HOT MELT ADHESIVE

(71) Applicant: HENKEL AG & CO. KGAA, Duesseldorf (DE)

(72) Inventor: Ai Takamori, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/384,457

(22) Filed: Dec. 20, 2016

(65) Prior Publication Data

US 2017/0101559 A1    Apr. 13, 2017

Related U.S. Application Data

(63) Continuation of application No. PCT/JP2015/067809, filed on Jun. 15, 2015.

(30) Foreign Application Priority Data

Jun. 30, 2014  (JP) ................ 2014-134259

(51) Int. Cl.

| C09J 129/14 | (2006.01) |
|---|---|
| B31F 1/28 | (2006.01) |
| B31F 1/22 | (2006.01) |
| C09J 123/08 | (2006.01) |
| C08L 23/08 | (2006.01) |
| C08L 91/06 | (2006.01) |

(52) U.S. Cl.
CPC ............ *C09J 129/14* (2013.01); *B31F 1/225* (2013.01); *B31F 1/2818* (2013.01); *C08L 23/0815* (2013.01); *C08L 23/0869* (2013.01); *C08L 91/06* (2013.01); *C09J 123/08* (2013.01)

(58) Field of Classification Search
CPC ... C09J 129/14; C09J 7/04; B31F 1/28; B31F 1/22
USPC ........................................ 524/310
See application file for complete search history.

(56) References Cited

U.S. PATENT DOCUMENTS

| 3,644,245 A | 2/1972 | Flanagan et al. |
| 2003/0096896 A1* | 5/2003 | Wang .................. C09J 123/10 524/425 |
| 2010/0047499 A1* | 2/2010 | Braksmayer .......... C09J 191/06 428/40.5 |
| 2016/0272853 A1* | 9/2016 | Takamori ............... C08L 23/02 |

FOREIGN PATENT DOCUMENTS

| CN | 104087204 A | | 10/2014 |
| JP | 59-149944 A | | 8/1984 |
| JP | 2000302922 A | | 10/2000 |
| JP | 2000303387 A | | 10/2000 |
| JP | 2005290193 A | | 10/2005 |
| JP | 2007297623 A | | 11/2007 |
| JP | 2008527067 A | | 7/2008 |
| JP | 2008214539 A | | 9/2008 |
| JP | 2012177009 A | | 9/2012 |
| JP | 2014159563 A | | 9/2014 |
| JP | 2015-105345 | * | 6/2015 |
| WO | WO 99/13016 | * | 3/1999 |
| WO | 2012005270 A1 | | 1/2012 |

OTHER PUBLICATIONS

Richard J. Lewis, Sr., Hawley's Condensed Chemical Dictionary, Published1997, Van Nostrand Reinhold, 13th Edition, p. 888.*

\* cited by examiner

*Primary Examiner* — Deve E Valdez
(74) *Attorney, Agent, or Firm* — Sun Hee Lehmann

(57) ABSTRACT

The object of the present invention is to provide a hot melt adhesive which is less likely to cause stringing, and has excellent thermal stability and adhesion, in particular adhesion to a paper material. The present invention relates to a hot melt adhesive comprising: (A) an olefin-based polymer, (B) a butyral resin, (C) at least one selected from the group consisting of a fatty acid and a derivative thereof, and (D) a tackifier resin.

4 Claims, No Drawings

HOT MELT ADHESIVE

FIELD OF THE INVENTION

The present invention relates to a hot melt adhesive and more specifically to a hot melt adhesive which has excellent adhesion to various substrates and is particularly suitable for assembling paper substrates such as corrugated cardboards.

BACKGROUND OF THE INVENTION

A hot melt adhesive is a solvent-less adhesive, which is heat-melted, applied to an adherend, and then solidified by cooling to exhibit adhesion, and thus a hot melt adhesive enables instantaneous adhesion and rapid adhesion, and is applicable in wide variety fields such as paper processing, woodworking, hygienic materials, and electronics.

As a base polymer for the hot melt adhesive, for example, an ethylene-based copolymer such as an ethylene-vinyl acetate copolymer (hereinafter also referred to as "EVA") and an ethylene-ethylacrylate copolymer (hereinafter also referred to as "EEA"), an olefin-based resin such as polyethylene, polypropylene, amorphous polyalphaolefin (hereinafter also referred to as "APAO"), a styrene-based block copolymer (e.g., styrene-isoprene-styrene-based block copolymer (hereinafter also referred to as "SIS") and styrene-butadiene-styrene-based block copolymer (hereinafter also referred to as "SBS")) and a synthetic rubber of hydrogenated product thereof, and polyurethane are widely used, depending on intended use of the hot melt adhesive.

Among these hot melt adhesives, a hot melt adhesive including an ethylene-based copolymer as base polymer is often used in a paper processing field such as book binding and packaging, and a woodworking field.

For application of a hot melt adhesive, a dedicated coating device called hot melt applicator is often used. The hot melt applicator has a nozzle, i.e., a discharge opening. The hot melt adhesive heated to about 120 to 190° C. is discharged from the tip of the nozzle for application to an adherend. In application of the hot melt adhesive, a hot melt adhesive string may sometimes occur between the tip of nozzle and the adherend. The occurrence of string is due to the stringing properties of a hot melt adhesive, soiling the nozzle and the adherend. Accordingly, adhesive manufacturers have important responsibility for developing a hot melt adhesive having less stringing.

In Japanese Patent Laid-Open No. 2008-527067 and Japanese Patent Laid-Open No. 2008-214539, ethylene (polyolefin)-based hot melt adhesives with the purpose of reducing stringing are described. Japanese Patent Laid-Open No. 2008-527067 discloses a hot melt adhesive including ethylene/$C_3$-$C_{20}$ α-olefin copolymer as base polymer, for use in packaging, book binding, woodworking and the like. Japanese Patent Laid-Open No. 2008-214539 discloses an olefin hot melt adhesive which includes a "stringing reducing agent" which is formed by modifying an olefin with unsaturated polycarboxylic acid, or acid anhydride or ester thereof.

Reducing stringing of a hot melt adhesive has been more severely required year by year. Particularly, users of thick paper such as corrugated cardboards and cartons earnestly require the reduction in stringing. Although the hot melt adhesives of Japanese Patent Laid-Open No. 2008-527067 and Japanese Patent Laid-Open No. 2008-214539 have reduced stringing properties, it cannot be said that the performance severely required by the users is sufficiently satisfied with the adhesives.

Japanese Patent Laid-Open No. 2012-177009 discloses an ethylene-based hot melt adhesive in which the composition of ethylene/carboxylic acid ester is adjusted to a specific range and which can thus reduce stringing at a high level and which has excellent heat resistance and thermal stability. However, demands for hot melt adhesives from users have been increasing over the years. The hot melt adhesive of Japanese Patent Laid-Open No. 2012-177009 cannot be said to satisfy the users' high demand for properties of adhesion to paper.

Also, cartons having a surface coated with a chemical have been frequently used to package products recently to add a high quality feeling to the packaging of products. Therefore, hot melt adhesives are required to have a certain level of adhesion even to the coating surface of cartons. It is an urgent need in the hot melt adhesive industry to develop an ethylene-based hot melt adhesive capable of reducing stringing, having excellent thermal stability and also having excellent properties of adhesion to paper.

BRIEF SUMMARY OF THE INVENTION

An object of the present invention is to provide a hot melt adhesive capable of reducing stringing, having excellent thermal stability and having excellent adhesion to paper, furthermore, to cartons the surface of which is coated with a chemical.

The present invention and preferred embodiments of the present invention are as follows.
1. A hot melt adhesive comprising:
    (A) an olefin-based polymer,
    (B) a butyral resin,
    (C) at least one selected from the group consisting of a fatty acid and a derivative thereof; and
    (D) a tackifier resin.
2. The hot melt adhesive according to the above item 1, wherein the fatty acid derivative comprises castor oil and/or hardened castor oil.
3. The hot melt adhesive according to any one of the above item 1 or 2, wherein the olefin-based polymer (A) comprises ethylene-based copolymer.
4. The hot melt adhesive according to the above item 3, wherein the ethylene-based copolymer comprises a copolymer of ethylene and an olefin having 3 to 20 carbon atoms.
5. The hot melt adhesive according to the above item 4, wherein the copolymer of ethylene and an olefin having 3 to 20 carbon atoms comprises a copolymer of ethylene, propylene and 1-butene.
6. The hot melt adhesive according to any one of the above items 1 to 5, wherein the olefin-based polymer (A) comprises a polar functional group-modified olefin-based polymer.
7. The hot melt adhesive according to any one of the above items 1 to 6, further comprising (E) a wax.
8. The hot melt adhesive according to the above item 7, wherein the wax (E) comprises a Fischer-Tropsch wax.
9. A paper product produced by applying the hot melt adhesive according to any one of above items 1 to 8.

The present invention provides a hot melt adhesive having high thermal stability, high adhesion to paper or the like, and reduced stringing.

DETAILED DESCRIPTION OF THE INVENTION

The hot melt adhesive of the present invention comprises at least (A) an olefin-based polymer, (B) a butyral resin, (C)

at least one selected from the group consisting of a fatty acid and a derivative thereof and (D) a tackifier resin, and preferably further comprises (E) a wax. Hereinafter, these may be described below as "(A) component", "(B) component", "(C) component", "(D) component" and "(E) component" respectively. The hot melt adhesive of the present invention is an olefin-based hot melt adhesive comprising a butyral resin and at least one selected from the group consisting of a fatty acid and a derivative thereof, and the butyral resin is compatible with other components in the adhesive. The hot melt adhesive has high thermal stability, high adhesion to paper, and the like, and reduced stringing. The hot melt adhesive of the present invention is easily applied to corrugated cardboards and carton paper, and has a high adhesion force to these paper substrates.

<(A) Olefin-Based Polymer>

In the hot melt adhesive of the present invention, the use of the olefin-based polymer (A) improves adhesion to a polyolefin substrate, while maintaining the adhesion to a paper substrate. The improved adhesion to a polyolefin substrate allows the hot melt adhesive of the present invention to be used not only for processing paper but also for manufacturing vehicle interior material and hygienic material which are formed of polyolefin.

In the present invention, an "olefin-based polymer" means a polymer having a structural unit based on an olefin, and may be an olefin homopolymer or a copolymer obtained by copolymerizing an olefin and a copolymerizable compound. In the present invention, preference is given to a polyolefin-based copolymer containing an olefin in an amount of 50% by weight or more, preferably 80% by weight or more (including 100% by weight), and containing a compound copolymerizable with an olefin in an amount of less than 50% by weight, preferably less than 20% by weight.

As the olefin, ethylene or an α-olefin having 3 to 20 carbon atoms is preferred. Examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations thereof. While these may be used alone or in combination of two or more of these, ethylene is preferably contained as the olefin.

In the present invention, the olefin-based polymer may contain a structural unit based on a compound copolymerizable with an olefin to the extent that the object of the present invention is not impaired.

Examples of the compound copolymerizable with an olefin include unsaturated carboxylic acids or derivatives thereof and carboxylates, specifically, unsaturated carboxylic acids or derivatives thereof including acrylic acid, methacrylic acid and (meth)acrylates (for example, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, lauryl acrylate, lauryl methacrylate, stearyl acrylate, stearyl methacrylate, hydroxyethyl acrylate, hydroxyethyl methacrylate, hydroxypropyl acrylate, hydroxypropyl methacrylate, acrylates or methacrylates of polyethylene glycol and polypropylene glycol, trimethoxysilylpropyl acrylate, trimethoxysilylpropyl methacrylate, methyldimethoxysilylpropyl acrylate, methyldimethoxysilylpropyl methacrylate, methyl α-hydroxymethylacrylate, dimethylaminoethyl acrylate and dimethylaminoethyl methacrylate); and vinyl carboxylates including monofunctional aliphatic vinyl carboxylates (for example, vinyl formate, vinyl acetate, vinyl propionate, vinyl butyrate, vinyl caproate, vinyl caprylate, vinyl caprate, vinyl laurate, vinyl myristate, vinyl palmitate, vinyl stearate, isopropenyl acetate, 1-butenyl acetate, vinyl pivalate, vinyl 2-ethylhexanoate and vinyl cyclohexanecarboxylate), aromatic vinyl carboxylates (for example, vinyl benzoate and vinyl cinnamate), polyfunctional vinyl carboxylates (for example, vinyl monochloroacetate, divinyl adipate, vinyl methacrylate, vinyl crotonate and vinyl sorbate), and styrene. Among these, methyl acrylate, ethyl acrylate and methacrylic acid are preferred. These may be used alone or in combination of two or more of these.

In the present invention, the olefin-based polymer (A) may be either a homopolymer or a copolymer, preferably including an ethylene-based copolymer. An "ethylene-based copolymer" herein means a copolymer of ethylene and other polymerizable monomer(s).

The "other polymerizable monomer" means a monomer having a double bond between carbon atoms which enables addition polymerization with ethylene. Specific examples of the "other polymerizable monomer" include an "olefin-based hydrocarbon except for ethylene" and a "carboxylate ester having an ethylenic double bond".

Examples of the "olefin-based hydrocarbon except for ethylene" include olefin having 3 to 20 carbon atoms, and α-olefin having 3 to 20 carbon atoms is preferred. Examples of the "olefin-based hydrocarbon except for ethylene" include propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, and 2,3-dimethyl-2-butene.

Examples of the "carboxylate ester having an ethylenic double bond" include (meth)acrylate ester such as methyl (meth)acrylate, butyl (meth)acrylate, and 2-ethylhexyl (meth)acrylate, and vinyl carboxylate and allyl ester such as vinyl acetate and allyl acetate.

The "other polymerizable monomer" may be used singly or in combination of two or more.

In the present invention, the ethylene-based copolymer preferably includes a "copolymer of ethylene and an olefin except for ethylene" in view of the adhesion to a paper substrate. Accordingly, the "other polymerizable monomer" is preferably an "olefin-based hydrocarbon except for ethylene", more preferably an olefin having 3 to 20 carbon atoms, even more preferably α-olefin having 3 to 20 carbon atoms. Among these, it is preferable to include at least one selected from propylene, butene and octene.

Examples of the "copolymer of ethylene and an olefin except for ethylene" preferably specifically include a copolymer of ethylene and octene, a copolymer of ethylene, propylene and 1-butene, a copolymer of ethylene and propylene, and a copolymer of ethylene and 1-butene, more preferably a copolymer of ethylene and 1-octene, and a copolymer of ethylene, propylene and 1-butene, and particularly preferably a copolymer of ethylene, propylene and 1-butene. The copolymers of ethylene and an olefin may be used singly or in combination. A commercialized product may be used as the copolymer of ethylene and an olefin.

Examples of the "copolymer of ethylene, propylene and 1-butene" include VESTOPLAST 703 (trade name) and VESTOPLAST 708 (trade name) made by Evonik Degussa GmbH.

Examples of the "copolymer of ethylene and octane" include AFFINITY GA1900 (trade name), AFFINITY GA1950 (trade name), AFFINITY EG8185 (trade name), AFFINITY EG8200 (trade name), ENGAGE 8137 (trade name), ENGAGE 8180 (trade name), and ENGAGE 8400 (trade name) made by The Dow Chemical Company.

Examples of the "copolymer of ethylene and propylene" include EASTOFLEX E1016PL-1 made by Eastman Chemical Company.

In the present invention, the ethylene-based copolymer may include a copolymer of ethylene and at least one selected from the "carboxylate ester having an ethylenic double bond", which may be a commercialized product, and may be used singly or in combination of two or more.

Examples of the "copolymer of ethylene and a carboxylate ester having an ethylenic double bond" include an ethylene-vinyl acetate copolymer, an ethylene-methyl methacrylate copolymer, an ethylene-2-ethylhexyl acrylate copolymer, an ethylene-butyl acrylate copolymer, and an ethylene-butyl methacrylate copolymer. Among them, an ethylene-vinyl acetate copolymer and ethylene-methyl methacrylate copolymer are more preferred, and an ethylene-vinyl acetate copolymer is particularly preferred.

In the hot melt adhesive of the present invention, a homopolymer such as polyethylene and polypropylene may be used as the (A) component.

In the present invention, the olefin-based polymer (A) is a concept also including a polar functional group-modified olefin-based polymer. Examples of the "polar functional group" of the "polar functional group-modified olefin-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic anhydride group, an epoxy group, a maleic acid group and a carboxyl group are more preferred, a maleic acid group and an epoxy group are more preferred.

As a method for producing the polar functional group-modified olefin-based polymer, the polar functional group-modified olefin-based polymer may be produced by synthesizing an olefin-based polymer, and introducing a polar functional group later, or by performing a copolymerization reaction using a monomer containing a polar functional group. As the monomer containing a polar functional group, for example, glycidyl methacrylate is preferred.

Examples of the "polar functional group-modified olefin-based polymer" include an ethylene/methyl acrylate/glycidyl methacrylate copolymerized resin, an ethylene-glycidyl methacrylate-styrene copolymer, a maleic anhydride-modified polyethylene copolymer, ethylene/1-octene maleic acid copolymer and ethylene/ethyl acrylate maleic acid copolymer. In the polar functional group-modified olefin-based polymer, the position at which a polar functional group, such as an epoxy group or a maleic anhydride group, is introduced is not particularly limited. The polar functional group may be introduced into an end of the polymer or into the structural unit at inside of the polymer other than the ends of the polymer.

As the polar functional group-modified olefin-based polymer, commercial products may be used. Examples thereof include BONDFAST 7M manufactured by Sumitomo Chemical Co., Ltd., MODIPER A4100 manufactured by NOF CORPORATION, AFFINITY GA1000R manufactured by Dow Chemical Company, BONDINE HX8210 manufactured by Arkema K.K. and Fusabond N525 manufactured by DuPont.

In the hot melt adhesive of the present invention, the use of a polar functional group-modified olefin-based polymer further improves the compatibility of the butyral resin with other components. As a result, a hot melt adhesive having reduced stringing, and excellent thermal stability and adhesion, in particular, adhesion to paper substrates can be provided.

In the present invention, the olefin-based polymer (A) preferably contains both a polar functional group-modified olefin-based polymer ($\alpha$) and an olefin-based polymer having no polar functional group ($\beta$). This is because when the olefin-based polymer (A) contains ($\alpha$) and ($\beta$), the compatibility of a butyral resin (B) described later with other components in the hot melt adhesive is further improved.

In the present invention, it is preferable that the (A) component contains an olefin-based polymer having a weight average molecular weight (Mw) of preferably 1000 to 150000, more preferably 2000 to 100000, and most preferably 25000 to 80000. Moreover, the hot melt adhesive of the present invention may contain one (A) component alone, or two or more of them in combination. The weight average molecular weight or number average molecular weight is measured by gel permeation chromatography (GPC) using a calibration curve using monodisperse molecular weight polystyrene as a standard substance to convert molecular weight.

<(B) Butyral Resin>

In the hot melt adhesive of the present invention, the use of a butyral resin (B) improves thermal stability and adhesion to paper and PET (polyethylene terephthalate) or the like.

In the present specification, the (B) butyral resin may be a resin containing butyral group or a chemical structure derived from butyral group, and examples thereof include polyvinyl butyral resins and modified polyvinyl butyral resins. The butyral resin may contain, for example, hydroxyl group or acetic acid group (acetoxy group) in addition to butyral group. The butyral resin can be obtained, for example, by acetalization reaction of polyvinyl alcohol and butyl aldehyde (preferably n-butyl aldehyde). In this case, it is preferred that preferably 50% by mole or more, and more preferably 60% by mole or more of the hydroxyl groups of polyvinyl alcohol is substituted with butyral group; for example, a butyral resin in which 50 to 80% by mole of the hydroxyl groups of polyvinyl alcohol is substituted with butyral group may be used. Also, part or all of the hydroxyl groups not substituted with butyral group may be acetylated (may be acetoxy group). An example of structural moieties of the (B) butyral resin will be shown in the following formula (1).

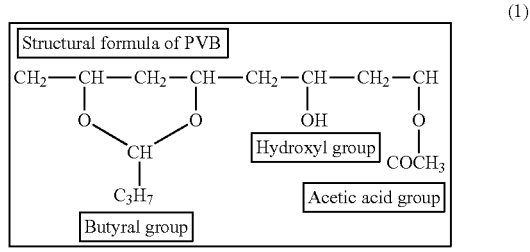

(1)

In the present invention, the butyral resin (B) has a number average molecular weight of preferably 15,000 to 200,000, more preferably 15,000 to 150,000, and further preferably 15,000 to 130,000. The adhesion of the hot melt adhesive of the present invention can be adjusted by the polymerization degree of the butyral resin. In consideration of adhesion properties, a butyral resin having a high polymerization degree is preferred, and in consideration of coating properties, a butyral resin having a low polymerization degree is preferred, which may be appropriately adjusted depending on purposes of use.

One butyral resin (B) may be used alone, or two or more of them may be used in combination.

Examples of butyral resins that can be used for the hot melt adhesive of the present invention include, for example, S-LEC B series. Examples of S-LEC B series include, for example, BL-1, BL-2, BL-3, BL-S, BX-L, BM-1, BM-2, BM-5, BM-S, BH-S, BH-3, BX-2, BX-5 and BX-55 (these all available from SEKISUI CHEMICAL CO., LTD.). Other examples of butyral resins include Mowital B14S, B16H, B20H, B30T, B30H, B45M, B45H, B60T, B60H and B75H (these all available from KURARAY CO., LTD.).

Among them, as high polymerization degree products (having a number average molecular weight of preferably 55,000 or more, more preferably 60,000 or more and 200,000 or less), BH-3 and BH-S are preferred; as middle polymerization degree products (having a number average molecular weight of preferably 35,000 or more and 70,000 or less, more preferably 38,000 or more and less than 60,000), BM-1 and BM-S are preferred; and as low polymerization degree products (having a number average molecular weight of preferably 45,000 or less, more preferably 15,000 or more and less than 38,000), BL-1 and BL-S are preferred.

<(C) Fatty Acid and Derivative Thereof>

The hot melt adhesive of the present invention contains at least one selected from the group consisting of a fatty acid and a derivative thereof (C). The use of at least one selected from the group consisting of the fatty acid and a derivative thereof (C) in the hot melt adhesive enhances compatibility of the butyral resin (B) with other components in the adhesive. Herein, the term "(C) component" does not contain the olefin-based polymer described as the (A) component.

Herein, the fatty acid means an aliphatic carboxylic acid having at least one carboxy group, and may have a hydroxy group. The fatty acid is broadly divided into a saturated fatty acid and an unsaturated fatty acid. The saturated fatty acid is an acid having no double bond or triple bond in a carbon chain. The unsaturated fatty acid is an acid having a double bond or a triple bond in a carbon chain.

Any saturated fatty acid may be used as long as it does not adversely affect the hot melt adhesive of the present invention, and it has preferably 1 to 30 carbon atoms, more preferably 3 to 26 carbon atoms, even more preferably 8 to 24 carbon atoms, and yet even more preferably 16 to 22 carbon atoms. The saturated fatty acid may be chain or cyclic, and preferably chain. The chain saturated fatty acid may have a straight chain or a branched chain, and is preferably a straight-chain saturated fatty acid. Specific examples of the saturated fatty acid include formic acid, acetic acid, propionic acid, butyric acid, valeric acid, caproic acid, lauric acid, tridecyl acid, myristic acid, palmitic acid, stearic acid, tricosyl acid, and 12-hydroxy stearic acid, and preferably stearic acid or 12-hydroxy stearic acid.

Any unsaturated fatty acid may be used as long as it does not adversely affect the hot melt adhesive of the present invention, and it has preferably 3 to 26 carbon atoms, more preferably 4 to 22 carbon atoms, and even more preferably 16 to 22 carbon atoms. Examples of the unsaturated fatty acid include crotonic acid, oleic acid, linolenic acid, docosahexaenoic acid, linoleic acid, and ricinoleic acid.

In the present specification, the fatty acid derivative means a compound obtainable by the substitution or other chemical reaction of fatty acids. Examples of the fatty acid derivative include fat and oil, hardened oil, fatty acid amide, aliphatic alkyl ester, monoglyceride, and diglyceride, and preferably fat and oil and hardened oil.

The "fat and oil" mainly contains triglyceride which is an ester of fatty acid and glycerin. The hot melt adhesive of the present invention may contain fat and oil generally used as edible or industry fat and oil. The fat and oil may be a fluid or a solid at normal temperature (about 20 to 26° C.), and preferably a fluid at normal temperature. Examples of the fat and oil include salad oil, corn oil, soybean oil, epoxidized soybean oil, sesame oil, linseed oil, olive oil, lettuce oil, fish oil, butter, lard, castor oil, grease, engine oil, and cutting oil, and preferably castor oil and epoxidized soybean oil.

The "hardened oil" is obtained by subjecting fat and oil which are a fluid at normal temperature to hydrogenation and increasing the ratio of saturated fatty acid having a higher melting point to solidify the fat and oil at normal temperature.

Any "hardened oil" may be used as long as it does not adversely affect the hot melt adhesive of the present invention. Specific examples of the hardened oil include castor oil subjected to hydrogenation (that is, hydrogenated castor oil), hydrogenated soybean oil, and hydrogenated salad oil, and preferably hydrogenated castor oil.

In the present invention, in consideration of the compatibility of the butyral resin (B) in the adhesive, the fatty acid derivative preferably contains "castor oil" and/or "hydrogenated castor oil". In the present invention, when "castor oil" is merely described, the "castor oil" means castor oil which is not hydrogenated.

As the fatty acid or a derivative thereof (C), commercial products may be used. Examples of such commercial products include BLAUNON BR-410 (trade name), BLAUNON BR-410 (trade name), BLAUNON BR-430 (trade name), BLAUNON BR-450 (trade name), BLAUNON CW-10 (trade name), BLAUNON RCW-20 (trade name), BLAUNON RCW-40 (trade name), BLAUNON RCW-50 (trade name), and BLAUNON RCW-60 (trade name) manufactured by Aoki Oil Industrial Co., Ltd.; LAV (trade name) manufactured by Itoh Oil Chemicals Co., Ltd.; and Caster Wax A (trade name), New Sizer 510R (trade name), Stearic Acid Sakura (trade name), Caster Hardened Fatty Acid (trade name), NAA-34 (trade name), NAA-160 (trade name), and NAA-175 (trade name) manufactured by NOF Corporation. These commercial fatty acid derivatives may be used singly or in combination.

<(D) Tackifier Resin>

In the hot melt adhesive of the present invention, the use of the tackifier resin (D) ((D) component) improves the pressure-sensitive adhesiveness. The "tackifier resin" is not particularly limited as long as it is generally used in hot melt adhesives and provides the hot melt adhesive targeted by the present invention.

Examples of the tackifier resin can include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. These tackifier resins may be used alone or in combination. For the tackifier resin, liquid type tackifier resins can also be used as long as they are colorless to pale yellow in color tone, have substantially no odor, and have good thermal stability. Considering these properties comprehensively, hydrogenated derivatives of resins and the like are preferred as the tackifier resin.

As the tackifier resin, commercial products may be used. Examples of such commercial products include MARUKA-CLEAR H (trade name) manufactured by Maruzen Petrochemical Co., Ltd., Clearon K100 (trade name) manufactured by YASUHARA CHEMICAL Co., Ltd., ARKON M100 (trade name) manufactured by Arakawa Chemical Industries, Ltd., I-MARV S100 (trade name), I-MARV P100 (trade name) manufactured by Idemitsu Kosan Co., Ltd., Clearon K4090 (trade name) and Clearon K4100 manufactured by YASUHARA CHEMICAL Co., Ltd., ECR5380 (trade name), ECR179EX (trade name), ECR5400 (trade name) and ECR5600 (trade name) manufactured by Exxon Mobil Corporation, Regalite R7100 (trade name) and Easttack H-100W (trade name) manufactured by Eastman Chemical Company, ECR179X (trade name) manufactured by Exxon, ARKON P100 (trade name) manufactured by Arakawa Chemical Industries, Ltd., I-marv S110 (trade name) and I-marv Y135 (trade name) manufactured by Idemitsu Kosan Co., Ltd., Easttack C100-R (trade name) manufactured by Easttack, and KR-85 (trade name) and "SUPER ESTER A-100" (trade name) manufactured by Arakawa Chemical Industries, Ltd. These commercial tackifier resins may be used singly or in combination.

<(E) Wax>

The hot melt adhesive of the present invention preferably contains a wax (E) in addition to the components (A) to (D). By comprising a wax (E), a hot melt adhesive having improved workability with reduced viscosity, adjusted open time, improved heat resistance, and reduced stringing can be obtained.

The "wax" herein means an organic substance generally called "wax", which is solid at normal temperature and forms liquid when heated, and is not specifically limited as long as having wax-like properties for obtaining the hot melt adhesive of the present invention. The wax generally has a weight-average molecular weight less than 10,000.

The wax (E) may be a wax commonly used for a hot melt adhesive which may be denatured with a polar functional group or the like, as long as the intended hot melt adhesive of the present invention can be obtained. Specific examples of the wax (E) include a synthetic wax such as a Fischer-Tropsch wax, a polyolefin wax (e.g. polyethylene wax and polypropylene wax), a petroleum wax such as paraffin wax and microcrystalline wax, and a natural wax such as castor wax.

In the present invention, the wax (E) preferably includes a Fischer-Tropsch wax. A Fischer-Tropsch wax means the wax synthesized by Fischer-Tropsch method and generally defined as a Fischer-Tropsch wax (including an acid-modified product). The Fischer-Tropsch wax is a wax fractionated from a wax including component molecules with a relatively wide distribution of the number of carbon atoms so as to include component molecules with a narrow distribution of the number of carbon atoms. Examples of the typical Fischer-Tropsch wax include SASOL H1 (trade name), SASOL H8 (trade name), SASOL H105 (trade name), and SASOL C80 (trade name), which are all available from Sasol Wax Limited.

Examples of the commercialized paraffin wax include PARAFFIN WAX-150 made by Nippon Seiro Co., Ltd.

One wax (E) may be used alone, or two or more of them may be used in combination.

When the hot melt adhesive of the present invention contains the wax, the hot melt adhesive has more reduced stringing properties, higher thermal stability and higher adhesion strength in high temperature ranges. It is preferable that the wax has a melting point of 50 to 120° C. The melting point of wax refers to a value measured by differential scanning calorimetry (DSC). More specifically, using DSC 6220 (trade name) made by SII Nano Technology Inc., 10 mg of a sample is precisely weighed into an aluminum container, and measured at a temperature increasing rate of 10° C./minute, and the temperature at the top of the melting peak is referred to as the melting point.

The hot melt adhesive of the present invention preferably comprises a stabilizing agent (F) (hereinafter also referred to as "component (F)") in addition to the components (A) to (D).

The "stabilizer" is blended to prevent reduction of molecular weight by heating, gelation, coloration, generation of an odor and the like in the hot melt adhesive to improve the stability of the hot melt adhesive. The "stabilizer" is not particularly limited as long as the hot melt adhesive targeted by the present invention can be obtained. Examples of the "stabilizer" include an antioxidant and an ultraviolet absorbing agent.

The "ultraviolet absorbing agent" is used to improve the light resistance of the hot melt adhesive. The "antioxidant" is used to prevent the oxidative degradation of the hot melt adhesive. The antioxidant and the ultraviolet absorbing agent are not particularly limited, and can be used as long as the targeted paper product described later can be obtained.

Examples of the antioxidant include phenol-based antioxidants, sulfur-based antioxidants and phosphorus-based antioxidants. Examples of the ultraviolet absorbing agent include benzotriazole-based ultraviolet absorbing agents and benzophenone-based ultraviolet absorbing agents. Further, a lactone-based stabilizer may also be added. These may be used alone or in combination. As commercial products of antioxidants, the following products may be used.

Specific examples thereof include SUMILIZER GM (trade name), SUMILIZER TPD (trade name) and SUMILIZER TPS (trade name) manufactured by Sumitomo Chemical Co., Ltd., IRGANOX 1010 (trade name), IRGANOX HP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., TOMINOX TT (trade name) manufactured by API Corporation and AO-412S (trade name) manufactured by ADEKA CORPORATION. These stabilizers may be used alone or in combination.

The hot melt adhesive of the present invention may further comprise a fine particle filler. The fine particle filler may be a generally used one, and is not particularly limited as long as the hot melt adhesive targeted by the present invention can be obtained. Examples of the "fine particle filler" include mica, calcium carbonate, kaolin, talc, titanium oxide, diatomaceous earth, urea-based resins, styrene beads, fired clay and starch. The shape of these is preferably a spherical shape, and their sizes (diameter in the case of a spherical shape) are not particularly limited.

The hot melt adhesive according to the present invention may be produced by blending the (A) component, the (B) component, the (C) component and the (D) component, and as required, the (E) component, the component (F) and various additives, using a generally known method for producing a hot melt adhesive. For example, the hot melt adhesive according to the present invention may be produced by blending predetermined amounts of the above-described components, and heating and melting them. The order of adding the components, the heating method and the like are not particularly limited as long as the targeted hot melt adhesive is obtained.

In an embodiment of the present invention, blending ratio of each component is preferably as follows.

In the hot melt adhesive of the present invention, the (A) component is blended preferably in an amount of 10 to 60 parts by weight, more preferably in an amount of 15 to 40 parts by weight based on 100 parts by weight of the total weight of the components (A) to (E).

The (B) component is blended preferably in an amount of 5 to 50 parts by weight, more preferably in an amount of 10 to 50 parts by weight, further preferably in an amount of 15 to 40 parts by weight based on 100 parts by weight of the total weight of the components (A) to (E).

The (C) component is blended preferably in an amount of 3 to 20 parts by weight, more preferably in an amount of 3 to 15 parts by weight, and most preferably in an amount of 5 to 15 parts by weight based on 100 parts by weight of the total weight of the components (A) to (E).

The (D) component is preferably 10 to 60 parts by weight, more preferably 20 to 50 parts by weight, and further preferably 20 to 40 parts by weight based on 100 parts by weight of the total weight of the components (A) to (E).

The (E) component may be blended in an amount of 0 parts by weight, but preferably in an amount of 10 to 40 parts by weight, more preferably in an amount of 15 to 40 parts by weight, and most preferably in an amount of 20 to 40 parts by weight based on 100 parts by weight of the total weight of the components (A) to (E).

When the (F) component is added to the hot melt adhesive of the present invention, the (F) component may be blended in an amount of 0 parts by weight, but preferably in an amount of 0.5 to 2.0 parts by weight, more preferably in an amount of 0.5 to 1.0 parts by weight based on 100 parts by weight of the total weight of the components (A) to (E).

In a more preferable embodiment of the present invention, the hot melt adhesive has a viscosity (or melt viscosity) at 150° C. of preferably 5,000 mPa·s or less, more preferably 3000 mP·s or less, and further preferably 2000 mPa·s or less.

The viscosity which permits homogeneous application of a hot melt adhesive is 5000 mPa·s or less, and the viscosity which facilitates homogeneous application of a hot melt adhesive is less than 2000 mPa·s. When a hot melt adhesive has a viscosity at 150° C. in the above range, the hot melt adhesive is much more suitable for coating. The viscosity (or melt viscosity) at 150° C. in the present specification means a value measured by a Brookfield viscometer using a rotor No. 27.

The hot melt adhesive of the present invention may be in various shapes, generally in a block shape or a film (sheet) shape at normal temperature. The block shape may be obtained by directly cooling and solidifying a product obtained by the manufacturing method, while the film (sheet) shape may be obtained by further forming the product obtained by the manufacturing method into a film shape.

The hot melt adhesive of the present invention may be applied to an adherend for use. No organic solvent is required to be blended in the hot melt adhesive when applied, resulting in an environmentally preferable adhesive.

The method for applying the hot melt adhesive is not particularly limited and generally known method for applying (or coating with) a hot melt adhesive may be used. Such application methods may be broadly divided into contact application and noncontact application. The "contact application" refers to an application method in which an ejection machine is brought into contact with a member or a film when the hot melt adhesive is applied. The "noncontact application" refers to an application method in which an ejection machine is not brought into contact with a member or a film when the hot melt adhesive is applied. Examples of the contact application method include slot coater coating and roll coater coating. Examples of the noncontact application method can include spiral coating which allows coatings in the form of a spiral, omega coating and control seam coating which allows coatings in the form of a wave, slot spray coating and curtain spray coating which allows coatings in the form of a plane, and dot coating which allows coatings in the form of dots, bead coating which allows coating in the form of a line. By the above application methods, the hot melt adhesive of the present invention is applied to various substrates at about 150° C.

The hot melt adhesive of the present invention is widely applicable in, for example, electronic components, woodworking, construction materials, hygienic materials, and paper products. The hot melt adhesive of the present invention can be suitably used in manufacturing paper products, and is particularly useful as hot melt adhesive for paper products.

The paper product of the present invention is a paper product which is manufactured using the hot melt adhesive. The types of the paper products are not specifically limited as long as the hot melt adhesive is used in manufacturing, specifically including, for example, book binding, calendars, corrugated cardboards, and cartons.

One preferred embodiment of paper products of the present invention is a carton (coated carton), the surface of which is coated with an agent for imparting high-grade feeling to a packaging of products.

Examples

For the purpose of describing the present invention in more details and more specifically, the present invention will be described below using Examples. These Examples are for describing the present invention, and do not limit the present invention in any way.

Components blended in hot melt adhesives are shown below.

<(A) Olefin-Based Polymer>
(A1) Propylene/ethylene/1-butene copolymer ("VESTOPLAST 703" available from Evonik Degussa GmbH, weight average molecular weight 34000)
(A2) Ethylene/octene copolymer ("AFFINITY GA1950" available from The Dow Chemical Company, weight average molecular weight 30000)
(A3) Ethylene/vinyl acetate copolymer ("Ultrathene 722" available from Tosoh Corporation, weight average molecular weight 60000)

(A4) Ethylene/methyl methacrylate polymer ("Acryft CM5022" available from Sumitomo Chemical Co., Ltd., weight average molecular weight 35000)
(A5) Polypropylene ("L-MODU S400" available from Idemitsu Kosan Co., Ltd., weight average molecular weight 40000)
(A6) Polyethylene ("Petrothene 249" available from Tosoh Corporation)
(A7) Ethylene/methyl acrylate/glycidyl methacrylate copolymerized resin ("BONDFAST 7M" (trade name) manufactured by Sumitomo Chemical Co., Ltd., weight-average molecular weight 140000)
(A8) Ethylene/1-octene maleic acid copolymer ("AFFINITY GA1000R" made by Dow Chemical Company, weight-average molecular weight 30000)
(A9) Ethylene/ethyl acrylate maleic acid copolymer ("BONDINE HX8210" made by Arkema K.K., weight-average molecular weight 80000)

<(B) Butyral Resin>
(B1) Polyvinyl butyral resin ("S-LEC B BL-1" available from SEKISUI CHEMICAL CO., LTD., number average molecular weight 19,000)
(B2) Polyvinyl butyral resin ("S-LEC B BM-1" available from SEKISUI CHEMICAL CO., LTD., number average molecular weight 40,000)
(B3) Polyvinyl butyral resin ("S-LEC B BH-3" available from SEKISUI CHEMICAL CO., LTD., number average molecular weight 110,000)

<(C) Fatty Acid and Derivative Thereof>
(C1) Hydrogenated hardened castor oil ("Caster Wax A" available from NOF Corporation)
(C2) Refined castor oil ("LAV" available from Itoh Oil Chemicals Co., Ltd.)
(C3) Epoxidized soybean oil ("New Sizer 510R" available from NOF Corporation)
(C4) Stearic acid ("Stearic Acid Sakura" available from NOF Corporation)
(C5) 12-Hydroxy stearic acid ("Castor Hardened Fatty Acid" available from NOF Corporation)
(C6) Oleic acid ("NAA-34" available from NOF Corporation)

<(D) Tackifier Resin>
(D1) Hydrogenated derivative of aromatic petroleum hydrocarbon resin ("I-MARV P100" available from Idemitsu Kosan Co., Ltd.)
(D2) Hydrogenated derivative of aromatic petroleum hydrocarbon resin ("I-MARV S100" available from Idemitsu Kosan Co., Ltd.)

<(E) Wax>
(E1) Paraffin wax ("Paraffin Wax 150" available from NIPPON SEIRO CO., LTD.)
(E2) Maleic acid-modified Fischer-Tropsch wax ("Sasol H105" available from Sasol Limited)
(E3) Fischer-Tropsch wax ("Sasol H1" available from Sasol Limited)
(E4) Fischer-Tropsch wax ("Sasol C80" available from Sasol Limited)

<(F) Stabilizing Agent>
(F1) Antioxidant ("AO-60" available from ADEKA CORPORATION)

These components were blended in a proportion (pats) by weight) shown in Tables 1 to 3, melted and mixed at about 160° C. over about 3 hours using a universal stirrer to prepare hot melt adhesives of Examples 1 to 21 and Comparative Examples 1 to 4. The numerical values for the composition (blend) of the hot melt adhesives shown in Tables 1 to 3 are all in part(s) by weight.

Thermal stability, adhesion to various substrate materials and stringing properties of each hot melt adhesive of Examples and Comparative Examples were evaluated. The results are shown in Tables 1 to 3. In the following, each evaluation will be summarized.

<Adhesion: Coated Carton>
(Sample Preparation)
A hot melt adhesive melted at 150° C. was applied to a carton having the surface coated with an agent. The application amount was 2 g/m.
The cartons were laminated under conditions with a setting time of 1 second, an open time of 1 second, and a pressing pressure of 1 kg/25 cm$^2$. The lamination was cut into a sample with a length of 5 cm and a width of 2.5 cm for evaluation.
(Evaluation Method)
The prepared sample was aged in a thermostatic chamber set at 23° C. with a humidity of 50% for 24 hours, and then the laminated cartons were forcibly detached by hand under the same atmosphere. The proportion of broken area to the entire adhesion area of the carton was defined as material breakage rate, and the state of breakage was evaluated.
∘∘: Material breakage rate was more than 80%.
∘: Material breakage rate was 65 to 80%.
x: Material breakage rate was less than 65%.

<Adhesion: Corrugated Cardboard>
(Sample Preparation)
A hot melt adhesive melted at 150° C. was applied to K liner corrugated cardboards with an application amount of 2 g/m, and the corrugated cardboards were laminated under conditions with a setting time of 10 seconds, an open time of 3 seconds, and a pressing pressure of 1 kg/25 cm$^2$. The lamination was cut into a sample with a length of 5 cm and a width of 2.5 cm for evaluation.
(Evaluation Method)
The prepared sample was aged in a thermostatic chamber set at 23° C. with a humidity of 50% for 24 hours, and then forcibly detached by hand under the same atmosphere. The proportion of broken area to the entire adhesion area of K liner corrugated cardboard was defined as material breakage rate (proportion of broken material), and the state of breakage was evaluated.
∘∘: Material breakage rate was more than 80%.
∘: Material breakage rate was 60% to 80%.
Δ: Material breakage rate was 40% or more and less than 60%.
x: Material breakage rate was less than 40%.

<Adhesion: PET>
(Sample Preparation)
A hot melt adhesive melted at 150° C. was applied to a polyethylene terephthalate (PET) film. The application amount was 2 g/m.
The PET films were laminated under conditions with a setting time of 1 second, an open time of 1 second, and a pressing pressure of 1 kg/25 cm$^2$. The lamination was cut into a sample with a length of 5 cm and a width of 2.5 cm for evaluation.
(Evaluation Method)
The prepared sample was aged in a thermostatic chamber set at 23° C. with a humidity of 50% for 24 hours, and then a 90° peel test was performed under the same atmosphere with a tensile tester.
∘∘: 1 kg/inch or more
∘: 0.5 kg/inch or more and less than 1 kg/inch
x: less than 0.5 kg/inch <Stringing Properties>

A hot melt adhesive was intermittently applied to an adherend disposed 20 cm away in vertical direction from the tip of a hot melt gun. The state of a falling object between the hot melt gun and the adherend was visually observed for evaluation of stringing properties.

(Measurement Conditions)
Temperature setting: 150° C. for all of tank, hose, and nozzle
Nozzle diameter: 14/1000 inch
Nozzle: 1-orifice (number of discharging port: 1) and 4-orifice (number of discharging port: 4)
Application pressure: 0.4 MPa
Application shot number: 350 shots/5 minutes for 1-orifice, and 70 shots/1 minute for 4-orifice
∘∘: Falling objects were in particle form.
∘: Falling objects were mostly in particle form and sparsely in string form.
Δ: Falling objects were mixed in particle form and in string form.
x: Falling objects were in string form.

<Thermal Stability>
(1) Thermal Stability Test at 150° C.
The thermal stability was visually determined by a change in appearance after 20 g of the hot melt adhesive was placed in a 70 mL glass bottle and allowed to stand in a dryer oven at 150° C. for 72 hours.
(2) Thermal Stability Test at 160° C.
The thermal stability was visually determined by a change in appearance after 20 g of the hot melt adhesive was placed in a 70 mL glass bottle and allowed to stand in a dryer oven at 160° C. for 168 hours.
∘∘: Phase separation, carbonized product or ring (a degraded product of the hot melt adhesive deposited in a ring shape) was not observed.
∘: Phase separation, carbonized product and a ring were very slightly observed.
Δ: Phase separation, carbonized product and a ring were slightly observed.
x: Phase separation, carbonized product and a ring were observed.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| (A1) |  |  |  |  |  |  | 2 |  |  |
| (A2) | 8 | 8 | 15 | 15 | 15 | 15 | 13 | 13 | 13 |
| (A3) | 2 | 2 |  |  |  |  |  |  |  |
| (A4) |  |  |  |  |  |  |  | 2 |  |
| (A5) |  |  |  |  |  |  |  |  | 2 |
| (A6) |  |  |  |  |  |  |  |  |  |
| (A7) |  |  |  |  |  |  |  |  |  |
| (A8) | 10 | 10 | 5 | 5 | 5 | 5 | 5 | 5 | 5 |
| (A9) |  |  |  |  |  |  |  |  |  |
| (B1) | 30 | 30 | 30 | 30 | 30 | 30 | 30 | 30 | 30 |
| (B2) |  |  |  |  |  |  |  |  |  |
| (B3) |  |  |  |  |  |  |  |  |  |
| (C1) | 5 |  |  |  |  |  | 5 | 5 | 5 |
| (C2) |  | 5 |  |  |  |  |  |  |  |
| (C3) |  |  | 5 |  |  |  |  |  |  |
| (C4) |  |  |  | 5 |  |  |  |  |  |
| (C5) |  |  |  |  | 5 |  |  |  |  |
| (C6) |  |  |  |  |  | 5 |  |  |  |
| (D1) |  |  |  |  |  |  |  |  |  |
| (D2) | 25 | 25 | 25 | 25 | 25 | 25 | 25 | 25 | 25 |
| (E1) |  |  |  |  |  |  |  |  |  |
| (E2) |  |  |  |  |  |  |  |  |  |
| (E3) | 20 | 20 | 20 | 20 | 20 | 20 | 20 | 20 | 20 |
| (E4) |  |  |  |  |  |  |  |  |  |
| (F1) | 0.9 | 0.9 | 0.9 | 0.9 | 0.9 | 0.9 | 0.9 | 0.9 | 0.9 |
| total (parts by weight) | 100.9 | 100.9 | 100.9 | 100.9 | 100.9 | 100.9 | 100.9 | 100.9 | 100.9 |
| Adhesion Property (corrugated cardboard) | ∘∘ | ∘∘ | ∘∘ | ∘∘ | ∘∘ | ∘∘ | ∘∘ | ∘∘ | ∘∘ |
| Adhesion Property (coated carton) | ∘∘ | ∘∘ | ∘∘ | ∘∘ | ∘∘ | ∘ | ∘∘ | ∘∘ | ∘ |
| Adhesion Property (PET) | ∘ | ∘ | ∘∘ | ∘ | ∘∘ | ∘ | ∘ | ∘ | ∘ |
| Stringing Property | ∘∘ | ∘∘ | ∘ | ∘ | ∘ | ∘ | ∘ | ∘∘ | ∘ |
| Thermal Stability (150° C. × 72 hours) | ∘∘ | ∘∘ | ∘ | ∘∘ | ∘∘ | ∘∘ | ∘ | ∘∘ | ∘ |
| Thermal Stability (160° C. × 168 hours) | ∘∘ | ∘∘ | ∘ | ∘∘ | ∘∘ | ∘∘ | ∘ | ∘∘ | ∘ |

TABLE 2

|  | Ex. 10 | Ex. 11 | Ex. 12 | Ex. 13 | Ex. 14 | Ex. 15 | Ex. 16 | Ex. 17 |
|---|---|---|---|---|---|---|---|---|
| (A1) |  |  |  |  |  |  |  |  |
| (A2) | 13 | 18 | 13 | 25 | 20 | 15 | 15 | 15 |
| (A3) |  |  |  |  |  |  |  |  |
| (A4) |  |  |  |  |  |  |  |  |
| (A5) |  |  |  |  |  |  |  |  |
| (A6) | 2 |  |  |  |  |  |  |  |
| (A7) |  | 2 |  |  |  |  |  |  |
| (A8) | 5 |  | 5 | 10 | 15 | 5 | 5 | 5 |
| (A9) |  |  | 2 |  |  |  |  |  |
| (B1) | 30 | 30 | 30 |  |  | 30 | 30 | 30 |
| (B2) |  |  |  | 15 |  |  |  |  |
| (B3) |  |  |  |  | 15 |  |  |  |
| (C1) | 5 | 5 | 5 | 5 | 5 | 10 | 15 | 5 |
| (C2) |  |  |  |  |  |  |  |  |
| (C3) |  |  |  |  |  |  |  |  |
| (C4) |  |  |  |  |  |  |  |  |
| (C5) |  |  |  |  |  |  |  |  |
| (C6) |  |  |  |  |  |  |  |  |
| (D1) |  |  |  |  |  |  |  | 5 |
| (D2) | 25 | 25 | 25 | 25 | 25 | 20 | 15 | 20 |
| (E1) |  |  |  |  |  |  |  |  |
| (E2) |  |  |  |  |  |  |  |  |
| (E3) | 20 | 20 | 20 | 20 | 20 | 20 | 20 |  |
| (E4) |  |  |  |  |  |  |  | 20 |
| (F1) | 0.9 | 0.9 | 0.9 | 0.9 | 0.9 | 0.9 | 0.9 | 0.9 |
| total (parts by weight) | 100.9 | 100.9 | 100.9 | 100.9 | 100.9 | 100.9 | 100.9 | 100.9 |
| Adhesion Property (corrugated cardboard) | ∘∘ | ∘ | ∘∘ | ∘∘ | ∘∘ | ∘∘ | ∘∘ | ∘∘ |
| Adhesion Property (coated carton) | ∘ | ∘ | ∘∘ | ∘∘ | ∘∘ | ∘∘ | ∘∘ | ∘∘ |
| Adhesion Property (PET) | ∘ | ∘ | ∘ | ∘ | ∘ | ∘ | ∘ | ∘ |
| Stringing Property | ∘ | ∘∘ | ∘ | ∘∘ | ∘∘ | ∘∘ | ∘∘ | ∘∘ |
| Thermal Stability (150° C. × 72 hours) | ∘ | ∘ | ∘∘ | ∘∘ | ∘∘ | ∘∘ | ∘∘ | ∘∘ |
| Thermal Stability (160° C. × 168 hours) | ∘ | ∘ | ∘ | ∘∘ | ∘∘ | ∘∘ | ∘ | ∘ |

TABLE 3

|  | Ex. 18 | Ex. 19 | Ex. 20 | Ex. 21 | Com. Ex. 1 | Com. Ex. 2 | Com. Ex. 3 | Com. Ex. 4 |
|---|---|---|---|---|---|---|---|---|
| (A1) |  |  |  |  |  |  |  |  |
| (A2) | 15 | 15 | 25 | 8 | 20 |  | 10 |  |
| (A3) |  |  |  |  |  |  |  |  |
| (A4) |  |  |  |  |  |  |  |  |
| (A5) |  |  |  |  |  |  |  | 35 |
| (A6) |  |  |  |  |  |  |  |  |
| (A7) |  |  |  |  |  |  |  |  |
| (A8) | 5 | 5 | 15 | 5 |  |  | 15 |  |
| (A9) |  |  |  |  |  |  |  |  |
| (B1) | 30 | 30 | 8 | 40 | 30 | 25 | 25 |  |
| (B2) |  |  |  |  |  |  |  |  |
| (B3) |  |  |  |  |  |  |  |  |
| (C1) | 5 | 5 | 2 | 13 |  | 15 | 20 | 10 |
| (C2) |  |  |  | 2 |  |  |  |  |
| (C3) |  |  |  |  |  |  |  |  |
| (C4) |  |  |  |  |  |  |  |  |
| (C5) |  |  |  |  |  |  |  |  |
| (C6) |  |  |  |  |  |  |  |  |
| (D1) |  |  |  |  |  |  |  | 35 |
| (D2) | 20 | 25 | 30 | 17 | 30 | 30 |  |  |
| (E1) | 15 | 10 |  |  |  |  |  |  |
| (E2) |  | 10 |  |  |  |  |  |  |
| (E3) | 10 |  | 20 |  | 20 | 30 | 30 | 20 |
| (E4) |  |  |  | 15 |  |  |  |  |
| (F1) | 0.9 | 0.9 | 0.9 | 0.9 | 0.9 | 0.9 | 0.9 | 0.9 |

TABLE 3-continued

|  | Ex. 18 | Ex. 19 | Ex. 20 | Ex. 21 | Com. Ex. 1 | Com. Ex. 2 | Com. Ex. 3 | Com. Ex. 4 |
| --- | --- | --- | --- | --- | --- | --- | --- | --- |
| total (parts by weight) | 100.9 | 100.9 | 100.9 | 100.9 | 100.9 | 100.9 | 100.9 | 100.9 |
| Adhesion Property (corrugated cardboard) | ○○ | ○○ | ○○ | ○ | ○○ | ○ | ○ | ○ |
| Adhesion Property (coated carton) | ○○ | ○○ | ○○ | ○ | ○○ | x | x | ○ |
| Adhesion Property (PET) | ○ | ○ | ○ | ○○ | ○ | x | x | x |
| Stringing Property | ○○ | ○ | ○ | ○ | ○ | x | ○ | ○ |
| Thermal Stability (150° C. × 72 hours) | ○○ | ○○ | ○ | ○ | ○ | x | ○ | x |
| Thermal Stability (160° C. × 168 hours) | ○ | ○ | ○ | ○ | x | x | x | x |

As shown in Tables 1 to 3, the hot melt adhesives of Examples 1 to 21 contain (A) to (D), and therefore have excellent adhesion to paper, improved stringing properties, and also excellent thermal stability. Since the hot melt adhesives of Comparative Examples do not contain one of the components (A) to (D), the hot melt adhesives have a poor balance of adhesion to paper, stringing properties, and thermal stability. Particularly, the thermal stabilities at 160° C. of all the hot melt adhesives of Comparative Examples 1 to 4 were x.

From these results, it is confirmed that total performance balance is improved by containing all of (A) to (D) in the hot melt adhesive.

INDUSTRIAL APPLICABILITY

The present invention provides a hot melt adhesive and a paper product to which the hot melt adhesive is applied. Among the paper products, the present invention is particularly effective in products made from thick paper such as corrugated cardboards and cartons.

The invention claimed is:

1. A hot melt adhesive consisting of:
   (A) a polymer mixture of (1) copolymer of ethylene and 1-octene and/or copolymer of ethylene, propylene, and 1-butene and (2) maleic acid modified olefin-based polymer and/or epoxy group modified olefin-based polymer,
   (B) a butyral resin,
   (C) a fatty acid and a derivative thereof selected from the group consisting of salad oil, corn oil, soybean oil, epoxidized soybean oil, sesame oil, linseed oil, olive oil, lettuce oil, fish oil, butter, lard, castor oil, grease, engine oil, cutting oil, and mixtures thereof,
   (D) a tackifier resin,
   (E) a wax, and
   (F) optionally, a stabilizer and/or additives.

2. The hot melt adhesive according to claim 1, wherein the derivative of the fatty acid comprises castor oil and/or hardened castor oil.

3. The hot melt adhesive according to claim 1, wherein the fatty acid and a derivative thereof is a fluid at temperatures of about 20 to 26° C.

4. A paper product comprises the hot melt adhesive according to claim 1.

* * * * *

UNITED STATES PATENT AND TRADEMARK OFFICE
CERTIFICATE OF CORRECTION

PATENT NO. : 10,513,639 B2
APPLICATION NO. : 15/384457
DATED : December 24, 2019
INVENTOR(S) : Ai Takamori It is certified that error appears in the above-identified patent and that said Letters Patent is hereby corrected as shown below:

In the Specification

Column 11, Line 53: Change "mP.s" to --mPa.s--

Signed and Sealed this
Fourth Day of August, 2020

Andrei Iancu
*Director of the United States Patent and Trademark Office*